Sept. 22, 1964   E. G. NEWMAN   3,150,356
MAGNETIC PATTERNS
Filed Dec. 22, 1961   4 Sheets-Sheet 1
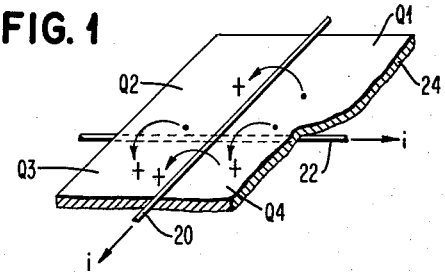
FIG. 1
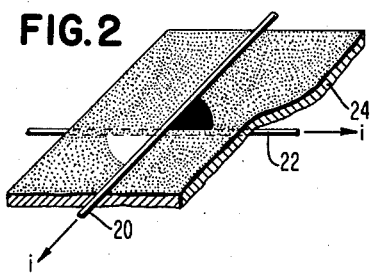
FIG. 2
FIG. 11
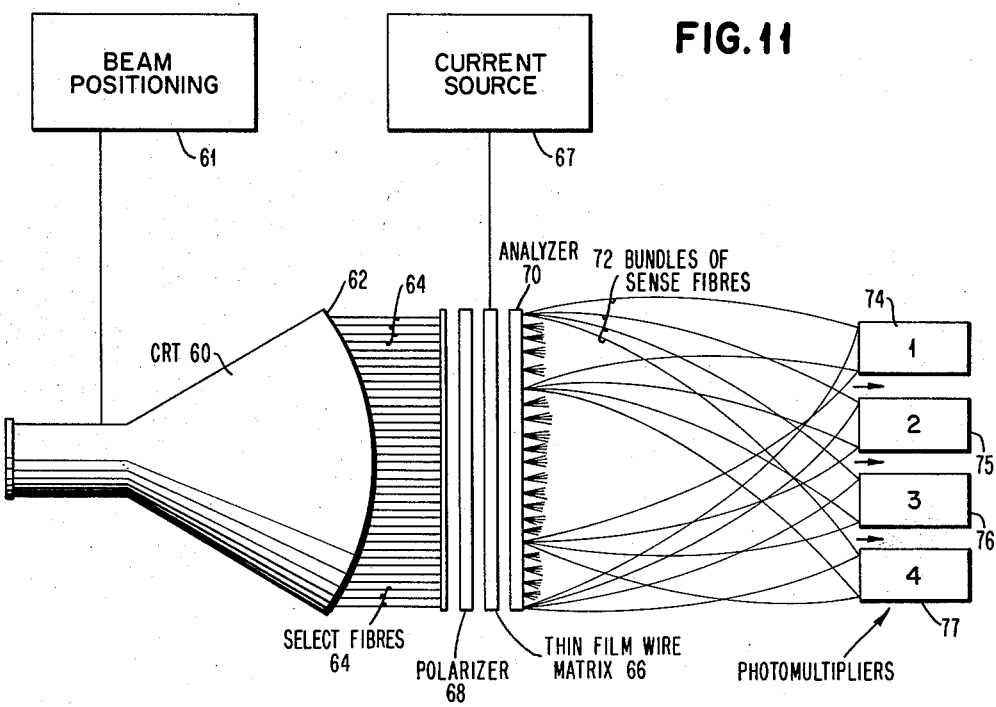
FIG. 14
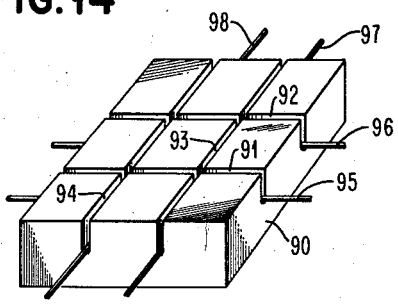
INVENTOR
ERNEST G. NEWMAN
BY *Melvin P. Williams*
AGENT

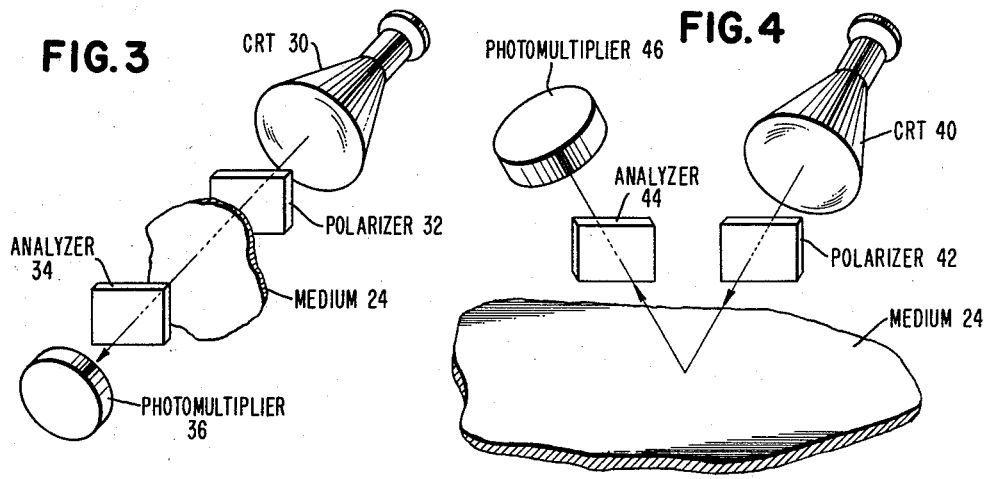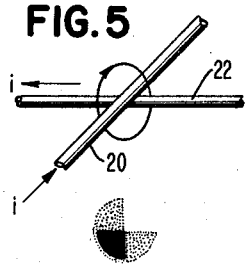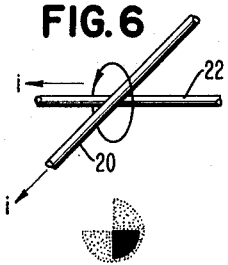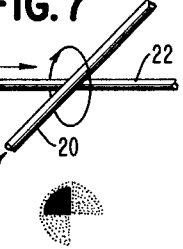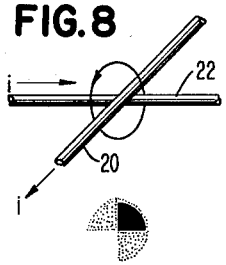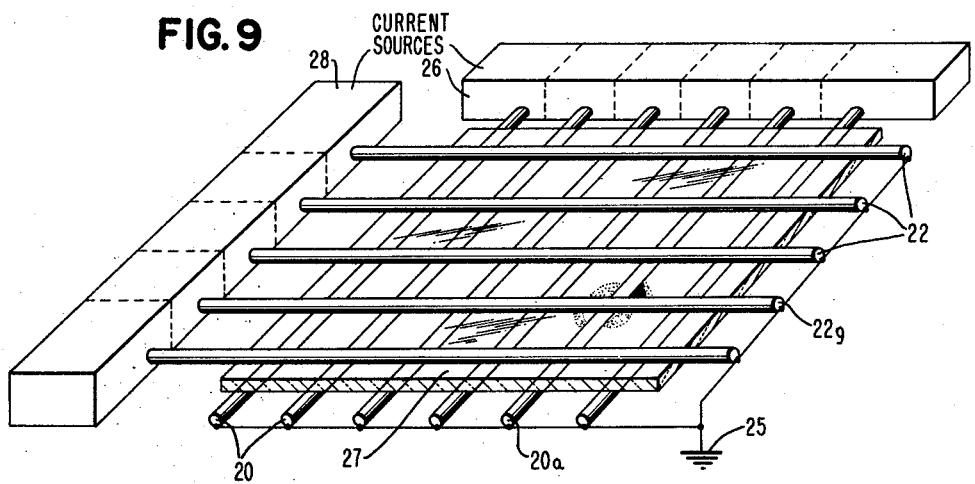

Sept. 22, 1964　　　E. G. NEWMAN　　　3,150,356
MAGNETIC PATTERNS
Filed Dec. 22, 1961　　　　　　　　　　　4 Sheets-Sheet 3
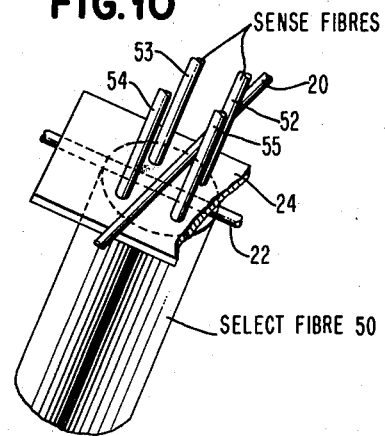
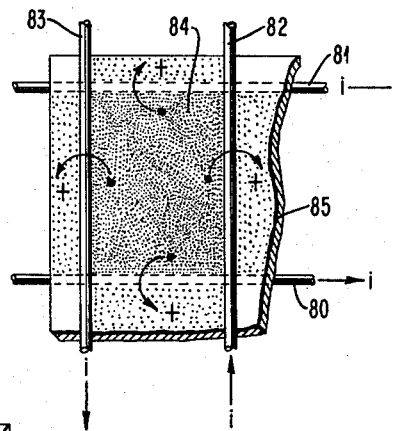
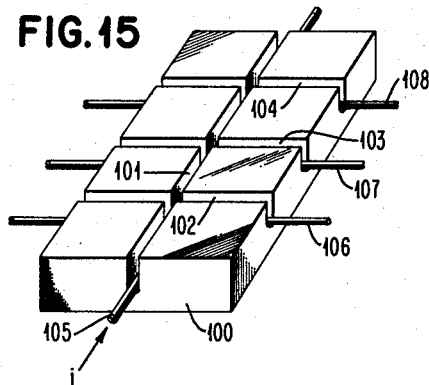
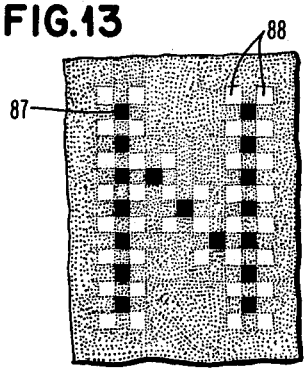
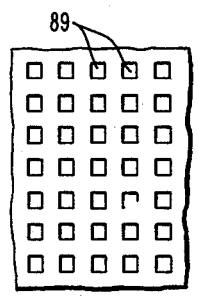

Sept. 22, 1964     E. G. NEWMAN     3,150,356
MAGNETIC PATTERNS

Filed Dec. 22, 1961     4 Sheets-Sheet 4

United States Patent Office

3,150,356
Patented Sept. 22, 1964

3,150,356
MAGNETIC PATTERNS
Ernest G. Newman, Poughkeepsie, N.Y., assignor to International Business Machines Corporation, New York, N.Y., a corporation of New York
Filed Dec. 22, 1961, Ser. No. 161,685
4 Claims. (Cl. 340—174)

This invention relates to magnetic patterns and more particularly to the generating and sensing of magnetic patterns representative of intelligible data, visual pictures, and the like.

In the field of data processing coded designations of many forms of data are recorded in various mediums, including coded magnetization on magnetic surfaces, and setting of the bi-stable states of magnetic and other devices. The field of data processing is also deeply concerned with the human-readable form of representation of data; this is so because most data achieves usefulness only when the ultimate form of the results of operations performed in response to or in modification of data manifestations are presented to a person for his use. Thus, there is an ever-increasing need for devices which may record and sense abstract data in such a way as to be adaptable for both machine and human-readable applications. In the field of data processing, the storage of abstract information in static elements (such as magnetic cores) is an extremely important area of technology. Similarly, storage of data on such media as magnetic tapes, drums and cards are of paramount importance in most data processing systems. In all of the recording applications in industry, modern trends include efforts to maximize the density of recording; this encompasses both a larger field of visual picture per size of record, and greater bit densities in abstract data recording which yield more information per unit size of record used. As the need for greater densities of recording has increased, subminiaturization has been perfected so that, in many areas, the possibilities for increasing densities through subminaturization have been exhausted. Additionally, means for recording which permit alternative methods of sensing, retrieving or viewing the recorded patterns are more desirable. Therefore, new and versatile means and methods for recording, with improved density characteristics, are highly important in advancing the art.

Therefore, a principal object of this invention is to provide a new means of generating and sensing an intelligent pattern.

Other objects of the invention include the following:

Provision of improved means for manifesting intelligible data;

Provision of improved means for recording and retrieving manifestations of intelligible information and visual patterns;

Provision of improved random access recording and sensing means;

Provision of a magnetic recording head with improved characteristics;

Provision of compact and inexpensive, recording means for manifesting and sensing data on an intelligible data record.

This invention is predicated on the concept that magnetic fields produced by an electrical current combine according to the well-known axioms of vector addition and subtraction when a plurality of such fields are in interference with one another.

In accordance with the present invention, a plurality of electrical currents are caused to flow in different directions in essentially the same plane so as to form an intersecting pattern of magnetic fields. The effects of the interference of the magnetic fields are manifested in a magnetizable medium, the state or condition of the magnetizable medium being indicative of the pattern of intelligible data or visual picture recorded as a result of the controlling electrical currents.

In further accordance with the present invention, means are provided for directing the combination of magnetic fields to discrete areas of the magnetizable medium, and for selecting discrete areas of the magnetizable medium for sensing the condition thereof in order to retrieve the intelligible information or picture manifested thereby. Optical readout methods utilizing the Faraday and Kerr effects are employed.

Because the manifestation is effected in a magnetizable medium merely in response to currents at the point where they cross, relatively simple, compact apparatus may be utilized. Furthermore, since there need not be an "element" per se at any point of manifestation, extremely high densities are inherently possible. Since the principal of nature being utilized is magnetization of a medium, a great variety of recording and sensing means are available in the art; the need for perfecting the technology of related fields is therefore minimal. Optical readout provides great versatility and permits use of relatively simple, inexpensive apparatus. The relative simplicity and high density characteristics of this particular invention provide a novel random access recording and sensing capability.

The foregoing and other objects, features and advantages of the invention will be apparent from the following more particular description of preferred embodiments thereof, as illustrated in the accompanying drawings.

In the drawings:

FIG. 1 is a perspective view of a pair of crossed wires operatively disposed adjacent to a magnetic medium in accordance with the present invention;

FIG. 2 is a perspective view of the apparatus shown in FIG. 1, illustrating the optical effects which may be obtained therewith;

FIG. 3 is a simplified perspective of means for determining the pattern in a device of the type shown in FIGS. 1 and 2 utilizing the Faraday effect;

FIG. 4 is a simplified perspective illustrating means for determining pattern in the device of FIGS. 1 and 2 utilizing the Kerr effect;

FIG. 5 is a simplified schematic diagram illustrating the recording of a manifestation of the binary designation ZERO ZERO;

FIG. 6 is a simplified schematic diagram illustrating the manifestation of the binary designation ZERO ONE;

FIG. 7 is a simplified schematic diagram of the manifestation of the binary designation ONE ZERO;

FIG. 8 is a simplified schematic diagram of the manifestation of the binary designation ONE ONE;

FIG. 9 is a simplified perspective of a matrix of crossings in accordance with the present invention;

FIG. 10 is a simplified perspective view of an optical fiber arrangement for sensing the condition of the medium of FIGS. 1 and 2;

FIG. 11 is a simplified schematic diagram of a system utilizing optical fibers of the kind shown in FIG. 10 for selectively sensing the various conditions of a medium to determine the data content thereof at particular crossings of a matrix of the type shown in FIG. 9;

FIG. 12 is a schematic diagram of an embodiment of the invention utilizing quadrature selection;

FIG. 13 is a schematic diagram of a character pattern which may be generated in accordance with the embodiment of FIG. 12;

FIG. 13A is a plan view of a mask which may be used with a pattern of the type shown in FIG. 13;

FIG. 14 is a perspective view of one embodiment of a magnetic head in accordance with the present invention;

FIG. 15 is a perspective view of a further embodiment of a magnetic head in accordance with the present invention;

Figure 12A:
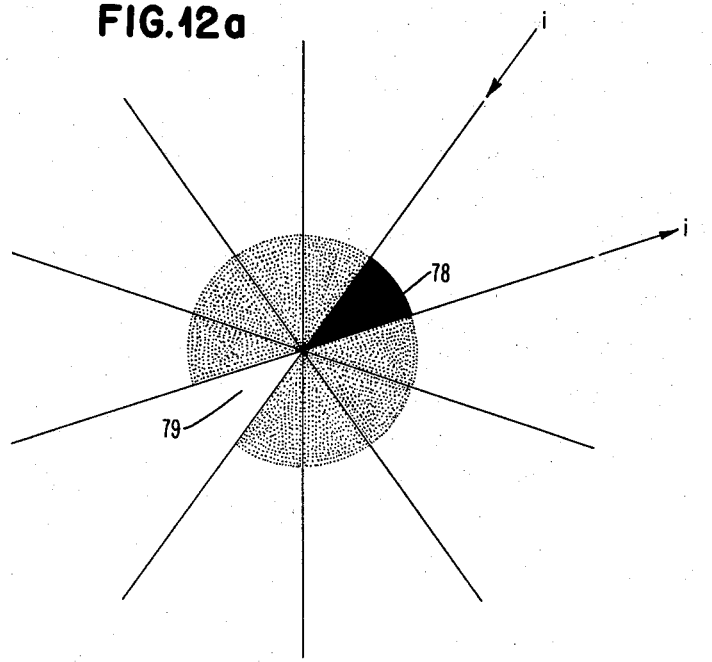
FIG. 12A is a schematic diagram illustrating a decimal pattern which may be generated with five crossed wires.

Referring now to FIG. 1, a pair of wires 20, 22 are disposed adjacent to respective opposite sides of a magnetizable medium 24 so as to be essentially perpendicular to each other. In accordance with the well-known "right-hand rule," current flowing in a conductor will create a magnetic field in which the magnetic field will be clockwise about the conductor when viewed in the direction in which current is flowing. Thus, when current is flowing from top to bottom in the conductor 20 (in the direction shown by the arrow in FIG. 1), magnetic flux will be counterclockwise about the conductor 20 as viewed in FIG. 1. Similarly, current flowing from left to right in the conductor 22 (as shown by the arrow in FIG. 1) will create a magnetic flux which follows lines from top to bottom (as viewed in FIG. 1) above the plane of the magnetic medium 24. Therefore, in an upper right-hand quadrant Q1 of the magnetic medium 24, flux is directed upwardly through the medium as a result of current flowing in each of the conductors 20, 22 which flux therefore is mutually aiding, giving a net upward flux of approximately twice the intensity of the individual strength of flux patterns resulting from the currents in either one of the separate windings 20, 22. In an upper left-hand quadrant Q2, flux will be directed downwardly and upwardly through the medium 24 as a result of current flowing in the conductors 20 and 22, respectively. Thus, the direction of flux resulting from each current is opposite that of the other, and the magnetic fields will cancel in the quadrant Q2, leaving the quadrant Q2 in a substantially unmagnetized state. Similarly, a lower left quadrant Q3 of the magnetic medium 24 will experience downward flux therethrough as a result of current flowing in each of the conductors 20, 22 which will aid each other in supplying a net downward flux to the medium 24 as the result of these currents. The lower right quadrant Q4 experiences upward and downward flux in the same manner as does the upper left quadrant Q2, the fluxes thereby cancelling each other and leaving the quadrant Q4 in a substantially unmagnetized condition.

Of particular significance in the recording of a pattern as shown in FIG. 1 is the fact that no pattern whatsoever is generated by current flowing in only one of the conductors 20, 22, due to the non-linear characteristics of the magnetic medium. This makes it possible to have a plurality of crossings (like the crossing shown in FIG. 1) arranged in a matrix fashion, with any one particular crossing being selectable by selecting the two wires which define that crossing. In contrast, the ordinary magnetic head has but a single conductor (or winding) which uniquely defines that particular magnetic head. Therefore, the number of selection windings needed will be as great as the number of magnetic heads which are provided. Recording in accordance with the present invention may be done at a precise one of $M \times N$ spots definable by selecting two out of $M+N$ conductors. This greatly enhances utilization of the invention in all high density applications as well as random access applications.

The magnetization of the medium 24 as a result of currents flowing in the conductors 20, 22 as described with reference to FIG. 1 can be sensed by utilizing either the Faraday effect (FIG. 3) or the Kerr effect (FIG. 4) to be described in detail hereinafter. Each of these effects is the rotation of the principal axis of polarized light by a magnetic field. Thus, if polarized light is passed through a magnetized medium or reflected off the surface thereof, respectively, the rotation of the polarized light depends upon the degree of remanent magnetization, together with the component of the direction of magnetization along the direction of propagation of the light.

The Faraday effect is the rotation of the plane of polarized light which is transmitted through a transparent isotropic medium in the direction of a magnetic field also present in the medium. The angle of rotation is directly proportional to the strength of the magnetic field, the length of the field through which the light passes, and a constant (the Verdet constant) which is a function of the properties of the specific medium employed. Most mediums which exhibit the Faraday effect are magnetizable, but some are not. However, the magnetizable mediums produce greater optical rotations (higher Verdet constant) than do non-magnetic mediums. For instance, zinc sulfide has a Verdet constant of about 0.2 minute per centimeter-gauss whereas nickel cobalt has a Verdet constant on the order of fifteen degrees per centimeter-gauss; when saturated, a nickel-cobalt thin film of 600 angstrom thickness would rotate polarized light about 1.8 degrees. The Kerr effect is the same as the Faraday effect except that reflected light is used and the length of field is determined by the depth of penetration into the surface of the medium by the polarized light. In FIG. 2 is shown a pattern which is presented to a polarized light analyzing means when the medium 24 is impinged upon by suitably polarized and analyzed light. Thus, the analyzer will absorb all of the light from a portion of the quadrant Q1 which is immediately adjacent to the intersection of the conductors 20, 22, and thereby present a completely dark area. Similarly, the analyzer will pass all of the light from the upper right-hand portion of the lower left-hand quadrant Q3, and thus present a pattern area which is extremely light.

Referring now to FIG. 3, the principle of developing the pattern as shown in FIG. 2 utilizing the Faraday effect is schematically shown to include a cathode ray tube (hereinafter referred to as CRT), which is utilized as a light beam generator 30, a polarizer 32 (which is a polarizing lens) for polarizing the light from the light beam generator, a magnetic medium 24, an analyzer unit 34 (which is another section of polarizing lens), and a photomultiplier 36. The light beam from the CRT 30 is polarized in a known direction by the polarizing lens 32, and the beam is thereafter passed through the magnetizable medium 24. The analyzer 34 is arranged to pass only that light which is rotated by a given amount from the orientation of polarization of the polarizer unit 32. Therefore, the photomultiplier 36 (or other photosensitive device) will be excited by an amount of light which is indicative of the magnetic state of the medium 24. By directing the beam of light from the cathode ray tube 30 to a particular part of the magnetic medium, the magnetic state of a particular quadrant Q1-Q4 of the medium as shown in FIG. 1 may be determined. Similarly, by directing a beam of light to the entire medium 24, and selectively receiving, at different photomultipliers, light passing through the different discrete portions of the medium 24, a comparison of the magnetic states of different portions of the medium can be made, which comparison will reveal a pattern similar to that shown in FIG. 2.

In FIG. 4 is shown apparatus similar to that of FIG. 3 arranged to utilize the Kerr effect in analyzing the magnetic state of the medium 24. In FIG. 4, the CRT 40 directs a beam of light through a polarizer 42 which polarizes the light. The polarized light thereafter impinges on the magnetic medium 24, and the orientation of the axis of polarization of the light reflected therefrom to an analyzer 44 is determined (as in FIG. 3) by the magnitude and relative orientation of the magnetic field in the medium 24 at the point where the polarized light impinges. A photomultiplier 46 or other photosensitive device will sense the amount of polarized light which passes through the analyzer 44, which amount will provide an indication of the pattern on the medium 24 (as in FIG. 3).

The Faraday effect illustrated in FIG. 3 is useful wherever the magnetic medium is transparent or translucent, so that the beam of polarized light can readily pass therethrough. However, whenever the magnetic medium is sufficiently opaque so as to substantially block light of any polarization, then the Kerr effect illustrated in FIG. 4 is more useful. It should be understood that FIGS. 3 and 4 merely illustrate the basic principle of operation of two different ways of analyzing the magnetic state of a magnetic medium 24. A more specific embodiment of means for determining the pattern of the medium 24 is described hereinafter.

Various patterns which may be generated in response to different combinations of current are illustrated in FIGS. 5–8. The patterns shown are patterns which would result with the polarizer and analyzer adjusted as necessary to derive the pattern in FIG. 2 in response to currents shown in FIG. 1. In FIG. 5, current passes upwardly through the conductor 20 and to the left in conductor 22 which creates a net downward flux in the quadrant Q1 and a net upward flux in the quadrant Q3, thereby generating a pattern which is light in the quadrant Q1 and dark in the quadrant Q3. This pattern may arbitrarily be assigned the binary designation ZERO ZERO. In FIG. 6 current passes to the left in the conductor 22 but downwardly in the conductor 20, thereby generating a net upward flux in the quadrant Q4 and a net downward flux in the quadrant Q2. This results in a light area in quadrant Q2 and a dark area in quadrant Q4. This pattern might arbitrarily be assigned the binary value ZERO ONE. In FIG. 7, current flows to the right in the conductor 22 and upwardly in the conductor 20, giving a net downward flux in quadrant Q4 and a net upward flux in quadrant Q2; this is just the opposite of the net fluxes which obtained with respect to FIG. 6. The resulting pattern is light in quadrant Q4 and dark in quadrant Q2, and this pattern might arbitrarily be assigned the binary value ONE ZERO. FIG. 8 is essentially the opposite in FIG. 5, with current flowing to the right in the conductor 22 and downwardly in the conductor 20, yielding a net upward flux in quadrant Q1 and a net downward flux in quadrant Q3. This is the same pattern as shown with respect to FIGS. 1 and 2. The pattern which is dark in quadrant Q1 and light in quadrant Q3 may arbitrarily be assigned a binary value ONE ONE. Thus, a single crossing of wires can provide for four different data designations, or could alternatively provide positive manifestation for both the presence or absence of two different data designations.

FIG. 9 is a schematic illustration of a matrix or grid work comprised of a plurality of conductors orthogonally arranged to produce a plurality of current crossings, each crossing being of the type described with respect to FIGS. 1 and 2 and FIGS. 5–8. As shown in FIG. 9, the matrix requires a magnetizable medium 27, such as a thin film of nickel cobalt, between the conductors 20 and the conductors 22. Each of the crossings may therefore represent a storage location or the location of the element for dynamic recording or reproducing of patterns. The conductors 20, 22 are each connected at one end to ground 25 (or other reference point of potential) and are each selectively energized to conduct a current in response to one of a corresponding group of current sources 26, 28, respectively. The current sources may be selectively operated in accordance with any well-known data processing methods.

In order to utilize the subject invention to the best advantage in a practical application, it is necessary to be able to distinguish between the various crossings of a matrix such as that shown in FIG. 9, and further, to determine precisely which of the patterns shown in FIGS. 5–8 obtain in any given case. Therefore, the apparatus shown in FIGS. 10 and 11 may be utilized in sensing the magnetic state of a medium 24 as described hereinbefore.

One embodiment of this invention utilizes fiber optics to determine the pattern which has been manifested in the magnetizable medium 24. Fiber optics utilizes the property of fibers of glass, quartz and certain plastics to transmit light by multiple internal reflections along their walls. Fiber optics is discussed by Dr. W. P. Siegmund in "Fiber Optics," The Glass Induutry, September 1960, page 502. In FIG. 10, the magnetizable medium 24, together with the crossed wires 20, 22 which will create a pattern in said medium, are shown together with optical fibers which transmit light to and from the magnetizable medium 24. In FIG. 10, the Faraday effect is being utilized, and therefore the magnetizable medium 24 must be transparent or translucent in character so as to permit the passage of light therethrough. A select fiber 50 is of a sufficient diameter so as to include each of the four quadrants Q1–Q4 of the magnetizable medium 24. Alternatively, the selection may be affected by a plurality of smaller fibers arranged in a bundle, the bundle directing light to the entire crossing area in the same way as does the select fiber 50. In order to determine the magnetic pattern in the medium 24, a plurality of optical fibers 52–55 are utilized as sense fibers for respectively corresponding ones of the quadrants. The arrangement shown in FIG. 10 is such that the select fiber 50 is disposed adjacent the medium 24, and therefore arranged between a polarizer 32 (shown in FIG. 3 but not in FIG. 10) and the medium 24, and the sense fibers 52–55 are arranged to be between the medium 24 and the analyzer 34 (shown in FIG. 3). Thus, light polarized in the polarizer 32 is conducted to the magnetizable medium 24, wherein the orientation of the polarization is rotated by the magnetic fields within the magnetizable medium 24, and the sense fibers 52–55 then conduct the rotated polarized light to the analyzer 34. One way in which to sense the particular quadrant of the selected crossing in which the light spot of the pattern is located is to connect the sense fiber in each quadrant (for instance Q1) of each crossing to a photocell which also has connected to it the fibers from all other like quadrants (for instance, all other Q1 quadrants). Thus, four photocells would be provided, each one responding to a particular quadrant of all crossings; the fact of a given photocell being excited together with knowledge of the particular one of the crossings to which the polarized light was directed being indicative of the data being sensed. Instead of being one large fiber, the select fiber 50 could be a plurality of much smaller fibers fused into a single bundle. To completely adapt the circuit of FIG. 3 to utilize the fibers as shown in FIG. 10, four different photomultipliers are necessary to individually sense the amount of light passing through the analyzer 34 in response to each of the sense fibers 52–55 whereby an indication of the magnetic condition of the corresponding one of the quadrants Q1–Q4 may be obtained.

A preferred arrangement is shown in FIG. 11, which also shows, schematically, a complete system for sensing in accordance with the Faraday effect. Specifically, a CRT 60 directs a beam, under control of beam positioning means 61, to the phosphorescent screen area 62 to which are attached a plurality of select fibers 64, each of which corresponds to a crossing of wires in a thin film matrix of crossed wires 66 (as in FIG. 9) including a magnetizable medium. The ends of the select fibers abut against a polarizer 68, which polarizes light from each of the fibers in the same fashion. This arrangement of fibers is known as a "window," since it merely transmits light of high resolution a short distance. The polarizer 68 is disposed adjacent to the thin film matrix 66. On the opposite side of the thin film matrix 66 is an analyzer 70 which is oriented so as to pass light which is polarized in a given direction only. A plurality of sense fibers 72, one for each quadrant at each crossing of the matrix 66, are affixed to the analyzer at positions which render them sensitive to respectively corresponding quadrants at the related crossing. The sense fibers 72 are grouped by their quadrant significance so that all fibers relating to a particular quadrant are connected to the corresponding one of four photomultipliers (or other photosensitive devices) 74–77. Thus, the photomultiplier 74 is made to be responsive to all optical fibers which are disposed for excitation by light passing through the quadrant Q1 of any one of the plurality of wire crossings; the other photomultipliers 75–77 respond to the quadrants Q2–Q4 respectively, in a similar fashion. This arrangement of fibers is known as an image transducer. In operation, the CRT beam is directed to a particular one of the select fibers 64 which causes polarized light to impinge upon a particular crossing in a matrix 66, and one of the sense fibers 72 at the selected crossing will respond to more light than any of the others. That fiber is the one associated with a quadrant which rotates the polarized light into substantially the same orientation as that which the analyzer 70 is disposed to pass. The one of the fibers 72 which respectively corresponds to the particular quadrant of the selected crossing will supply the most light to the related one of the photomultipliers 74–77. Sensing of the selected photomultiplier may be done in any number of well-known ways in order to derive information desired in the particular embodiment in use.

For simplicity, the details of the CRT positioning means 61 have been omitted in FIG. 11. Any well-known means for adjusting the position of the CRT beam to coincide with a selected point on the phosphorescent screen area 62 of the CRT may be utilized; one example of a beam positioning means is shown in U.S. Patent 2,902,684, Signaling System, issued to R. G. Mork on September 1, 1959.

The description of preferred embodiments thus far has been concerned with generating a pattern at a single crossing of two wires, and the combination of such individual patterns in a matrical array. However, it is possible to generate patterns as a result of a greater number of crossed wires. For instance, five crossed wires are shown in FIG. 12A, which provide ten different interwire sectors, any one of which can be made dark (as sector 78 is shown) or light (as sector 79 is shown). Any one sector could be made dark (or light if desired) to represent a selected one of the decimal numerals. The embodiment shown in FIG. 12A may be expanded into a matrix by providing a plurality of wires parallel to each of the five wires shown in FIG. 12A. Thus, each of the five wires will participate in a plurality of crossings, each crossing representing a storage area, each sector (or portion) representing a different decimal value to be stored at the crossing. Another multiple wire pattern, this one having quadrature selection, is achieved by four crossings as shown in FIG. 12. This type of pattern might find greater utility in visual display devices of the type in which representations of legible characters are instantaneously generated and displayed for monitoring rapidly changing information. In FIG. 12, four wires 80–83 are shown with current passing therethrough so as to generate a net upward flux in a central area 84 of a magnetic medium 85, the area being located between the four wires 80–83. The optical readout as described hereinbefore could be utilized, and in fact, a magnetic medium disposed between a matrix of wires arranged to utilize a central area between four wires as a designated spot area could be viewed through an analyzer for instantaneous display purposes, without utilization of photoelectric devices. A pattern which may be generated is shown by way of example in FIG. 13, wherein alternate spots 87 are shown as being dark (for convenience of illustration only), the corner areas 88 around each dark spot being light, and all other areas being substantially gray. This pattern is based on a matrix of thirty-five possible spots, as is well-known in matrix printing, for illustration only. Of course, the display could be manifested in light spots, being somewhat surrounded by dark spots within a gray area if so desired in any given application of the invention.

Referring to FIGS. 12 and 13, it is seen that a display pattern must comprise a plurality of selected spot areas 87, each of which is defined by the combination of four conductors 80–83. Assuming that current is to be established in conductors such as conductors 80 and 81 to selectively cause dark spots in one row of a character matrix, it is obvious that the same currents would be flowing past any other spot areas between the conductors 80, 81. However, unless current is also applied as shown in FIG. 12 in vertical conductors such as the conductors 82, and 83, then the dark spot will not be created. But inasmuch as any other spots in a vertical column between the conductors 82 and 83 will be affected in the same manner as each other spot between these conductors, it becomes obvious that it is impossible to generate characters such as that shown in FIG. 13 with only one grid of horizontal conducctors and one grid of vertical conductors. Therefore, it is necessary to supply a pair of conductors in at least one direction (that is, in either the horizontal or vertical direction) in order to have a plurality of spots in a row which are different as well as a plurality of spots in a column which are different. This may be effected by having a plurality of horizontal conductor planes arranged adjacent to one another, each horizontal plane controlling the spots in a different one of the vertical columns. In such a case, one pair of conductors would suffice for a vertical row of spots. Alternatively, a plurality of vertical conductor planes could be provided, one for each row of spots, there being a single horizontal conductor plane for all of the spots. Instead of the pattern shown in FIG. 13, which is made according to the embodiment shown in FIG. 12, the quadrant type of patterns (FIGS. 1, 2, etc.) could be used as desired in any display apparatus. The particular nature of the display desired, and the adaptability to receive the information to be displayed will determine in part which of the two methods described will be employed.

It can be understood that the pattern in FIG. 12 permits quadrature selection of particular head areas—that is, that all four wires around an area must be properly energized in order to have that area develop a completely light or a completely dark condition.

A display device in accordance with FIGS. 12 and 13 may be provided with a mask (FIG. 13A) having selectively-placed holes 89 so as to permit only selected ones (for instance, those shown dark) of all the areas between four wires to be visible. Alternatively, it is possible to utilize individual wires for each displayed spot, which, although it requires a greater number of wires, would supply complete versatility so that any one spot could be given any condition desired. Further, it is possible to make every visible spot area either light or dark by placing a plurality of grids one after the other as laminations of a total grid assembly whereby a spot in one of the layers would appear to be adjacent to a spot in a subsequent layer, when viewed.

As described hereinbefore, the magnetizable medium is placed between the current-carrying conductors so as to have an equal magnetic effect from currents of the same magnitude. However, if both conductors were on the same side of the medium, the conductor nearer to the medium could carry less current than the other, thereby generating magnetic fields of equal strength in the magnetizable medium. Alternatively, magnetic material may be used to conduct flux to the medium, as in the embodiment described immediately hereinafter.

Another embodiment of this invention, shown in FIG. 14, comprises a matrix of crossed wires (as described hereinbefore) wherein the matrix is formed with a magnetic head core assembly 90 having a plurality of slots 91–94 to receive corresponding wires 95–98, respectively. This embodiment provides a magnetically efficient way to record on a medium (such as a tape) which is not placed *between* the crossed wires. The slots 91–94 also provide gaps across which the magnetic fields may be generated, thereby providing ability to magnetize surfaces proximate to the upper surfaces of the head 90. The bottom edges of the slots 91–94 may be enlarged to accommodate the wires 95–98 which must be of some minimum thickness, while maintaining a minimum width of slot (or gap) at the upper surface of the head 90, which minimum width thereby permits maximum flux density across the slot. Each of the wires 95–98 should be insulated from the head, and from other wires which it crosses. The slots 91, 92 may be more shallow than the slots 93, 94 (or vice versa) so that the wires will not intersect. However, the exact shape and dimension of the magnetic head 90 and gaps 91–94 may be adjusted to suit the particular design criteria in any given embodiment of the invention.

A magnetic head constructed in accordance with the present invention, such as the embodiment shown in FIG. 14, can be made much smaller and much more simply than are conventional magnetic heads. For instance, the magnetic head piece 90 may be a single piece of material or built-up of laminations in any direction desired, and the block may thereafter be drilled and milled so as to provide the proper slots 91–94 with or without enlargement at the base of the slots to accommodate the wires 95–98. Using the magnetic head in accordance with the present invention, it is possible to achieve recorded surfaces having less than five thousandths of an inch allocated to each longitudinal track of the record. In the embodiment shown in FIG. 14, crossings including only one of the conductors 97, 98 may be recorded at a single time. This is so because a given current flowing in either of the conductors 95, 96 in order to create the proper pattern in the crossing with the conductor 97 will axiomatically be the same current as it crosses the conductor 98. In other words, selection of currents in the conductors 95 and 96 to be proper for the crossing at conductor 97 may be improper for the pattern to be generated at the crossing with conductor 98. Therefore, the embodiment shown in FIG. 14 may be serially operated so as to provide serial recording while the magnetizable surface used therewith is at rest, or the head may be constructed with only a single gap in one direction as is shown in FIG. 15, in which case serial recording may be effected only by moving the medium or the head.

In FIG. 15, a head 100 is shown having a single gap 101 in one direction and a plurality of gaps 102–104 in the other direction. A wire 105 in the gap 101 could be utilized as a gating line, and the wires 106–108 in the gaps 102–104, respectively, could be used to generate the selected bits. When so used, only two magnetic conditions of the four illustrated in FIGS. 5–8 are possible. Specifically, if current were to flow in the wire 105 upward and to the right as shown by the arrow, then only the patterns shown in FIGS. 7 and 8 would be possible. Alternatively, if current flowed in the opposite direction in the wire 105, then all of the patterns in the intersection of the other wires 106–108 would have to be either one of the two shown in FIGS. 5 and 6.

Figure 16:
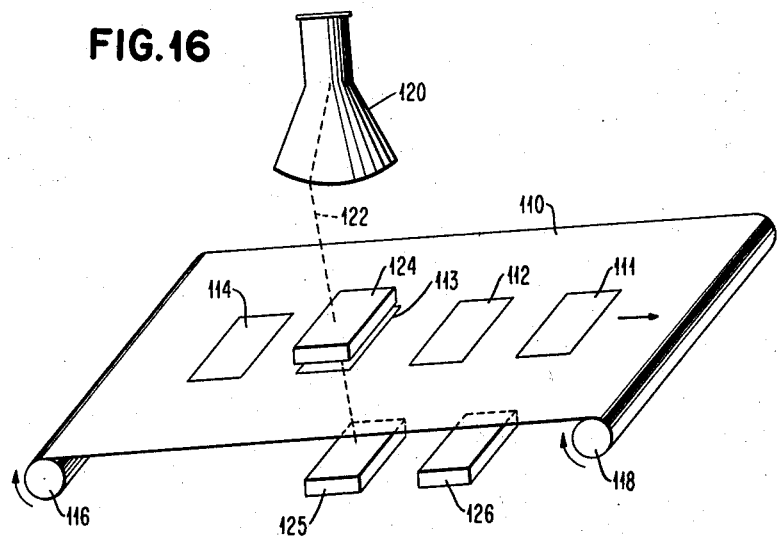
FIG. 16 is a perspective view of an additional embodiment of this invention wherein random recording and sensing within information blocks on a record may be achieved.

Referring now to FIG. 16, a magnetic record 110 is shown being transferred from left to right between two reels or spools 116, 118. The record 110 may be a tape of magnetizable thin film as described hereinbefore, or any other form of magnetic material, the Faraday effect being utilized for thin film or other sufficiently transparent materials, and the Kerr effect being used to sense opaque materials. On the record 110 are shown a plurality of information blocks or areas 111–114. A CRT 120 is schematically shown with a beam 122 directed toward the record block 113. For simplicity, other apparatus of the type shown in FIG. 11 has been shown as blocks 124 and 125 in FIG. 16. The block 124 represents the polarizer and select fibers and the block 125 represents the analyzer, sense fibers and photoresponsive devices. In a "random access" type of sensing operation, the record 110 would be positioned with a selected one of the information blocks 111–114 (or other blocks not shown) beneath the CRT 120. Thereafter, any particular spot on the record 113 could be selected for sensing by fine positioning of the beam 122 as described with reference to FIG. 11.

As shown schematically by block 126, the random access embodiment of FIG. 16 could be recorded with a head of the type shown in FIG. 14 in either of two ways: Statically, by selectively energizing different combinations of wires to record at any or all of the gap crossings within the head 90, or by moving the record 110 while selectively energizing one of the conductors 97, 98 in combination with the conductors 95, 96. Serial recording could, of course, be similarly effective with the head shown in FIG. 15. Any other methods of recording could be utilized so as to provide blocks of information 111–114, and random access sensing utilizing either the Faraday or Kerr effects as described hereinbefore could be achieved within any one of the blocks 111–114 as shown in FIG. 16.

However, it should be understood that the relatively simple construction of the magnetic head shown in FIG. 14 permits much greater packing density per unit area when a static recording method is used than is possible with conventional magnetic head assemblies. This further enhances the advantages of using this invention for random recording within a block area (such as blocks 111–114 in FIG. 16), and therefore provides a greatly improved random-access recording ability for use in the art. Similarly, the speed and reliability of the optical fiber sensing means (described hereinbefore) for sensing selected ones of a plurality of data areas within one of the blocks 111–114 is much greater than that of prior art magnetic sensing heads.

Although the Faraday effect is displayed in an embodiment utilizing fiber optics, it should be understood that any flying-spot capable of developing a beam of sufficient resolution to accommodate the bit density characteristics in any embodiment of the invention may be employed. Although the exact details of the fiber optics have not been discussed, it should be understood that any of the characteristics well known in the fiber optics art which enhance the operation by giving greater resolutions, higher light intensities, or more reliable coherence (that is, the assurance that the input and output ends of each fiber are correctly identified) may be utilized to advantage in any given embodiment. Similarly, the use of ready-made CRT having the fibers affixed in defined positions on the screen portion of the tube may be used as desired. However, this is not essential to the invention as disclosed.

While the invention has been particularly shown and described with reference to preferred embodiments thereof, it will be understood by those skilled in the art that the foregoing and other changes in form and details may be made therein without departing from the spirit and scope of the invention.

What is claimed is:
1. A magnetic storage device, comprising:
   a plane of magnetically retentive material;
   first current conducting means for conducting a plurality of electrical currents in a plane parallel to the plane of said magnetically retentive material in a first direction;
   second current conducting means for conducting a plurality of electrical currents in a plane parallel with said magnetically retentive material in a second direction, said second direction being at an angle with respect to said first direction, said first and second current conducting means thereby defining a plurality of discrete areas at points at which they cross, each discrete area including a plurality of quadrants defined by the crossing;

current source means for generating a plurality of electrical currents of first and second polarity;

means for selectively applying currents of either polarity to said first and second current conducting means;

means for directing polarized light of a first orientation to a selected one of said discrete areas, the direction of polarization of which is rotated by magnetic fields established in said medium by said currents;

a plurality of photo-responsive means;

and means responsive to polarized light of a second orientation, including a plurality of light conducting branches, one for each of said quadrants, each associated with one of said photo-responsive means, each operative to conduct light of said second orientation from one of said quadrants to a corresponding one of said photo-responsive means.

2. A magnetizable medium having a planar configuration:

means responsive to electrical potential for generating a pattern of magnetic gradients in said magnetizable medium, said gradients being perpendicular to the principal plane of configuration of said medium;

a light source;

polarizer means for polarizing the light from said light source, said polarizer means being disposed so as to polarize light in a given orientation, said polarizer means being disposed in planar configuration parallel with and adjacent to said magnetizable medium;

optical fiber means for conducting light from said light source to said polarizer means, said optical fiber means causing light to impinge upon a first side of said polarizer means, the direction of polarization of said light being altered by said magnetic gradients;

an analyzer adapted to transmit light polarized in an orientation different from said polarizer, said analyzer being disposed to receive light emanating from said medium as a result of the conduction of light to said medium by said optical fiber means;

a plurality of photoelectric means;

a plurality of optical sensing fibers, each disposed so as to be responsive to a respectively corresponding portion of said analyzer means, said optical fiber means disposed in accordance with the magnetic pattern on said magnetizable medium, each of said photoelectric means being responsive to respectively corresponding optical sensing fibers for generating a manifestation of the amount of light conducted thereby.

3. A thin film of magnetizable material arranged in a planar configuration;

a first grid of co-planar, mutually parallel means for conducting electrical currents parallel with and adjacent to a first side of said thin film;

a second grid of mutually parallel, co-planar means for conducting electrical currents, said second grid being oriented so as to conduct current in a direction perpendicular to the currents conducted by said first grid, said second grid being parallel with and adjacent to a second side of said thin film;

a source of light;

polarizing means for polarizing said light, said polarizing means having a planar configuration and being disposed parallel with and adjacent to said first grid, said polarizing means being disposed with the principal axis of polarization in a first orientation;

analyzing means for passing polarized light, said analyzing means being of a planar configuration, said analyzing means being disposed parallel with and adjacent to said second grid, said analyzing means being disposed with its principal axis of polarization in a second orientation different from said first orientation;

a plurality of photoelectric means, each corresponding to at least one discrete portion of said analyzing means;

means for conducting light from said source to a selected one of a plurality of areas of said polarizing means;

and a plurality of means for conducting light, each corresponding to a single discrete portion of one of said areas of said polarizing means and associated with one of said photoelectric means, each for conducting light to the associated one of said photoelectric means from a respectively corresponding portion of said analyzing means.

4. A random access magnetic data storage system, comprising:

an essentially planar magnetic storage medium having at least one storage section disposed at a determinable position thereon, said section including a plurality of storage areas, each area comprising a plurality of discrete portions, data being represented in each area by the presence of a magnetic field perpendicular to the plane of said medium in a selected one of the discrete portions thereof;

means for providing magnetic fields perpendicular to the plane of said medium in selected portions on said record in accordance with a desired data pattern;

means for directing light polarized in a first direction to a selected one of said areas;

a plurality of photo-responsive means, one for each portion in an area;

and means for conducting light polarized in a direction different from said first direction from each of said portions to a corresponding one of said photocells.

References Cited in the file of this patent

UNITED STATES PATENTS

| 2,825,891 | Duinker | Mar. 4, 1958 |
| 2,833,936 | Reiss | May 6, 1958 |
| 2,984,825 | Fuller | May 16, 1961 |
| 3,040,301 | Howatt | June 19, 1962 |
| 3,059,538 | Sherwood | Oct. 23, 1962 |

OTHER REFERENCES

Publication I: Electronics, September 9, 1960, pp. 78 and 79 (#34).